United States Patent [19]

Goldstein et al.

[11] Patent Number: 5,569,555

[45] Date of Patent: Oct. 29, 1996

[54] RECHARGING OF ZINC BATTERIES

[75] Inventors: Jonathan R. Goldstein; Inna Gektin, both of Jerusalem; Menachem Givon, HaNegev; Yachin Yarchi, Jerusalem, all of Israel

[73] Assignee: Electric Fuel (E.F.L.) Ltd., Jerusalem, Israel

[21] Appl. No.: 321,788

[22] Filed: Oct. 12, 1994

[51] Int. Cl.⁶ .................................................. H01M 10/54
[52] U.S. Cl. ............................ 429/49; 241/201; 241/270
[58] Field of Search ................................ 429/49; 29/730, 29/731; 451/164, 170; 241/201, 270, 297

[56] References Cited

U.S. PATENT DOCUMENTS

| | | | |
|---|---|---|---|
| 2,204,024 | 6/1940 | Meinhart | 241/201 |
| 2,314,414 | 3/1943 | Meinhart | 241/201 |
| 4,694,996 | 9/1987 | Siegel | 241/270 X |
| 5,318,861 | 6/1994 | Harats et al. | 429/21 |
| 5,360,680 | 11/1994 | Goldman et al. | 429/27 |
| 5,405,713 | 4/1995 | Pecherer et al. | 429/49 |

FOREIGN PATENT DOCUMENTS

| | | |
|---|---|---|
| 0589101 | 3/1994 | European Pat. Off. |
| 0588382 | 3/1994 | European Pat. Off. |
| 306609 | 2/1929 | United Kingdom. |

OTHER PUBLICATIONS

W. Gerhartz, "Ullmann's Encyclopedia of Industrial Chemistry", Oct. 29, 1990, pp. 5-15 to 5-17.

*Primary Examiner*—Stephen Kalafut
*Attorney, Agent, or Firm*—Helfgott & Karas, P.C.

[57] ABSTRACT

The invention provides a process for removing discharged active zinc-containing material from a mechanically rechargeable zinc battery anode, containing the same, the anode being of the type comprising a skeletal frame, including conductive metal and having a portion of a surface area thereof formed as open spaces, and an active zinc anode component compacted into a rigid static bed of active anode material encompassing the skeletal frame, and having two opposite major surfaces, the process comprising introducing the anode between a pair of spaced-apart first and second crusher plates, each of the crusher plates being provided with a plurality of pointed projections of varying heights and a plurality of recesses of varying depths, the crusher plates being aligned with each other to the effect that tips of projections of the first crusher plate substantially mutually occlude with recesses provided on the second crusher plate and tips of projections of the second crusher plate substantially mutually occlude with recesses provided on the first surface; abruptly reducing the space between adjacent crusher plates said anode bed; moving said crusher plates away from said deformed anode bed and then displacing said deformed bed, along at least a first axis, by at least half the distance between adjacent projection tips of at least one of said crusher plates; again abruptly reducing the space between adjacent crusher plates; and repeating the last two steps until the fragmentation of the bed and the dislodgement of the resulting fragmented particles from the skeletal frame are achieved.

15 Claims, 4 Drawing Sheets

RECHARGING OF ZINC BATTERIES

The present invention relates to a process and apparatus for removing at least partly-oxidized zinc from a discharged rechargeable zinc battery anode, as well as to a refueling system for automated recharging of zinc air batteries incorporating said process and apparatus.

More particularly the present invention relates to an improvement on the refueling system for automated recharging of zinc-air batteries, as described in U.S. Pat. No. 5,405,713, the relevant teachings of which are incorporated herein by reference.

BACKGROUND OF THE INVENTION

Various proposals have been made in the past for electric-powered vehicles. To date, for a number of reasons, electric vehicle systems have yet to become generally commercially viable for urban and highway applications. There have been proposals to employ zinc-air batteries for urban vehicle propulsion. An example is the publication "Improved Slurry Zinc-Air Systems as Batteries for Urban Vehicle Propulsion," by P. C. Foller, *Journal of Applied Electrochemistry*, Vol. 16, pp. 527–543 (1986).

*Machine Design* of Sep. 21, 1989 carried a review of electric batteries and vehicles and found that delivery vans were likely to be the first commercially-produced electrically-driven vehicles.

The Bedford CF electric van, using a lead-acid battery, is in production in the United Kingdom. It has a 50–60 mile range and a top speed of 50 mph, as reported by the *Standard Handbook for Electrical Engineers*.

Metal-air battery structures are described in the following publications: U.S. Pat. No. 4,842,963, entitled "Zinc Electrode and Rechargeable Zinc-Air Battery;" U.S. Pat. No. 4,147,839, entitled "Electrochemical Cell with Stirred Slurry," U.S. Pat. No. 4,908,281, entitled "Metal-Air Battery with Recirculating Electrolyte;" U.S. Pat. No. 3,847,671, entitled "Hydraulically-Refuelable Metal-Gas Depolarized Battery System;" U.S. Pat. No. 4,925,744, entitled "Primary Aluminum-Air Battery;" U.S. Pat. No. 3,716,413, entitled "Rechargeable Electrochemical Power Supply;" U.S. Pat. No. 4,925,744, entitled "Primary Aluminum-Air Battery."

In U.S. Pat. No. 3,592,698, entitled "Metal Fuel Battery with Fuel Suspended in Electrolyte," there is described inter alia a method for circulating an electrolyte/metal fuel powder mixture through batteries; U.S. Pat. No. 4,126,733, entitled "Electrochemical Generator Comprising an Electrode in the Form of a Suspension" relates to a similar subject, using a circulated suspension of inert cores coated with an electrochemically active material. In U.S. Pat. No. 4,341,847, entitled "Electrochemical Zinc-Oxygen Cell," there is described a method in which an electrolyte is circulated in the annular space between concentric electrodes.

Electrical energy storage systems are described in the following publications: U.S. Pat. No. 4,843,251, entitled "Energy Storage and Supply Battery with Recirculating Electrolyte;" "Energy on Call" by John A. Casazza, et al., *IEEE Spectgrum*, June 1976, pp. 44–47; U.S. Pat. No. 4,275,310, entitled "Peak Power Generation;" U.S. Pat. No. 4,124,805, entitled "Pollution-Free Power Generating and Peak Power Load Shaving System;" U.S. Pat. No. 4,797,566, entitled "Energy Storing Apparatus."

Regeneration of spent zinc-containing alkaline electrolyte is described in a number of prior patents. For example, in U.S. Pat. No. 3,847,671 (mentioned above), whole spent electrolyte is subjected to electrolysis, when zinc deposited at the cathode is removed with a wiper blade. The thus-removed zinc is said to be substantially heavier than the electrolyte (35–40% KOH) and hence falls to the bottom of each cell. In a particular embodiment, the cathode and anode are specified as being made from copper (or silver-plated copper) and carbon, respectively. In U.S. Pat. No. 3,981,747, it is proposed to regenerate the spent zinc in an alkaline electrolyte by reaction with a strongly electropositive metal, such as magnesium or aluminum, which displaces the zinc. In U.S. Pat. No. 4,341,847 (also mentioned above), spent zinc in the alkaline electrolyte is regenerated either by reversing the current and plating zinc on the anode, or by mechanically replacing zinc oxide particles by active zinc particles, as described e.g. in co-pending U.S. patent application Ser. No. 08/016,019 filed Feb. 10, 1993, (now abandoned) the teachings of which are incorporated herein by reference.

Metal-air and particularly zinc-air battery systems are known in the art and, due to their high energy densities, relative safety of operation and the possibility of ready mechanical recharging, such systems have been suggested as a power source for electrically-propelled automotive vehicles.

In an effort to further increase the advantages of using zinc-air battery systems for electro-automotive propulsion, it has now been proposed to employ a mechanically-rechargeable battery system comprising a rigid anode designed to be rapidly removed and replaced on a periodic basis at dedicated service stations, specifically equipped for the purpose.

Such batteries are described in U.S. patent application Ser. No. 07/964,644, filed Oct. 21, 1992, now allowed and in U.S. patent application Ser. No. 08/002,656, filed Jan. 11, 1993, now allowed, the teaching of both of which are incorporated herein by reference.

In said co-pending applications, there are described improved zinc battery anodes, particularly for zinc-air batteries, featuring a skeletal frame comprising conductive metal having a portion of its surface area formed as open spaces, and an active zinc anode element encompassing the skeletal frame, and said active anode element formed of a slurry of porous granules comprising zinc, impregnated with and suspended in an electrolyte, compacted under pressure onto the skeletal frame.

Said specifications, however, do not teach or suggest a method for automated recharging of such anodes.

As will be realized, in order for such batteries to be commercially viable, it is important that the spent anodic material, which after use has been oxidized, be recycled external to the battery for later re-use in other batteries. To facilitate recycling of the active anodic material, it is necessary to separate the spent anodic material from the other anode components.

In U.S. Pat. No. 5,405,713 FIG. 7 and 8 illustrate the apparatus contemplated and taught at said time for removal of zinc oxide from the anode support frame.

As described therein, zinc, which has been at least partly oxidized, is mechanically removed from the support frame in a machine which is provided with a plurality of axes, each provided with revolvably-driven flexibly-suspended bodies. The machine is provided with means, for example a reciprocable air cylinder, to bring the support frame into contact with the bodies which act to delaminate the relatively brittle zinc oxide from the frame by rotating motion of bodies which angularly strike the anode material as they revolve around the axes to which they are attached.

It has been found, however, that the machine described therein is not sufficiently robust to effect the desired stripping of the discharged anode material from its supporting frame.

As will be realized, because of the mode of interaction, there is mutual abrasion between the anode bed and the revolving bodies. For this reason, metallic bodies could not be used because of problems of contamination of the zinc with other metal impurities.

Similarly, even strong plastic was rapidly eroded by the zinc bed.

Furthermore, there was found to be a conflict between the need to have bodies of sufficient size and mass to deliver significant blows to the rigid static bed of anode material and the stress hinderance between bodies attached to the same axis and effective contact along the entire bed when large bodies were used.

Finally, since the arrangement involved a rotation of 90° between the first contact of a body with the bed of material and the next contact of a second body attached to said same axis with a further area along said bed, the arrangement was found to be time-consuming in operation.

For all of the above reasons, this machine and approach were abandoned for large-scale commercial application.

Said specification also suggested the use of grappling means for pulverizing the discharged anode material. However, the various means tried were found to damage the skeletal frame which was also to be recycled and did not effectively remove the cement-like mass of anodic material from the skeletal frame.

With this state of the art in mind there is now provided according to the present invention a process for removing discharged active zinc-containing material from a mechanically rechargeable zinc battery anode, containing the same, said anode being of the type comprising a skeletal frame, including conductive metal and having a portion of a surface area thereof formed as open spaces, and an active zinc anode component compacted into a rigid static bed of active anode material of tight interparticulate structure encompassing the skeletal frame, and having two opposite major surfaces, said process comprising:

a) introducing said anode in which said active zinc has been at least partly oxidized, between a pair of spaced-apart first and second crusher plates, each of said crusher plates being provided with a plurality of pointed projections of varying heights and a plurality of recesses of varying depths substantially complementary to said projections, said crusher plates being aligned with each other to the effect that tips of projections of said first crusher plate substantially mutually occlude with recesses provided on said second crusher plate and tips of projections of said second crusher plate substantially mutually occlude with recesses provided on said first surface;

b) abruptly reducing the space between adjacent crusher plates while impacting at least indirectly on said anode bed positioned there-between to deform and crack said anode bed;

c) moving said crusher plates away from each other and from said deformed anode bed and then displacing said deformed bed, along at least a first axis, by at least half the distance between adjacent projection tips of at least one of said crusher plates;

d) once again abruptly reducing the space between adjacent crusher plates while impacting on and fragmenting said displaced anode bed; and e) repeating steps c and d until the fragmentation of said bed and the dislodgement of the resulting fragmented particles from said skeletal frame are achieved.

The invention also provides apparatus for removing discharged active zinc-containing material from a mechanically rechargeable zinc battery anode, containing the same, said anode being of the type comprising a skeletal frame, including conductive metal and having a portion of a surface area thereof formed as open spaces, and an active zinc anode component compacted into a rigid static bed of active anode material of tight interparticulate structure encompassing the skeletal frame, said apparatus comprising a pair of spaced-apart first and second crusher plates, each of said crusher plates being provided with a plurality of pointed projections of varying heights and a plurality of recesses of varying depths substantially complementary to said projections, said crusher plates being aligned with each other to the effect that tips of projections of said first crusher plate substantially mutually occlude with recesses provided on said second crusher plate and tips of projections of said second crusher plate substantially mutually occlude with recesses provided on said first crusher plate.

Preferably, said apparatus further comprises a pair of spaced-apart elastomeric sheets, each sheet being positioned adjacent one of said crusher plates and defining between themselves a cavity configured to accommodate said anode.

Said elastomeric sheets are preferably made of KOH-resistant material selected from the group consisting of ethylene-propylene polymers, neoprene and nitriles, and said surfaces are preferably made of a material selected from the group consisting of KOH-resistant metal, including nickel and nickel-plated stainless steel, and plastic, selected from the group consisting of polyvinylchloride, polysulfone and polyphenylene oxide.

The invention also provides a refueling system for automated recharging of zinc-air batteries of the type having a plurality of active zinc anode elements formed of active zinc material compactly pressed to a support frame immersed in an aqueous alkaline electrolyte in a battery casing, and of the type described in said aforementioned co-pending application, said system comprising:

a) automated means for simultaneously separating a plurality of spent anodes from said casing; said spent anodes comprising support frames to which are attached zinc which has been at least partially oxidized;

b) means for removing used electrolyte from said casing;

c) transport means for conveying spent anodes to an anode processing station;

d) said anode processing station, at which said zinc, which has been at least partly oxidized, is removed from said support frame, said station comprising apparatus for removing discharged active zinc-containing material from said spent anodes, said apparatus comprising a pair of spaced-apart first and second crusher plates, each of said crusher plates being provided with a plurality of pointed projections of varying heights and a plurality of recesses of varying depths substantially complementary to said projections, said crusher plates being aligned with each other to the effect that tips of projections of said first crusher plate substantially mutually occlude with recesses provided on said second crusher plate and tips of projections of said second crusher plate substantially mutually occlude with recesses provided on said first crusher plate, and at least one of said plates is operationally-linked to piston means for affecting abrupt movement between said plates.

e) means for attaching reconstituted active zinc material to a cleaned support frame, comprising a press provided with a container configured to hold said frame immersed in a pre-weighed zinc slurry, said press being provided with means for applying a pressure of at least 20 kg/cm² over the surface of said slurry, to form an active zinc anode, having active zinc material compactly pressed to support frame;

f) automated means for simultaneously introducing a plurality of active zinc anodes into said casing; and g) means for introducing fresh electrolyte into said casing.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Figure 1:
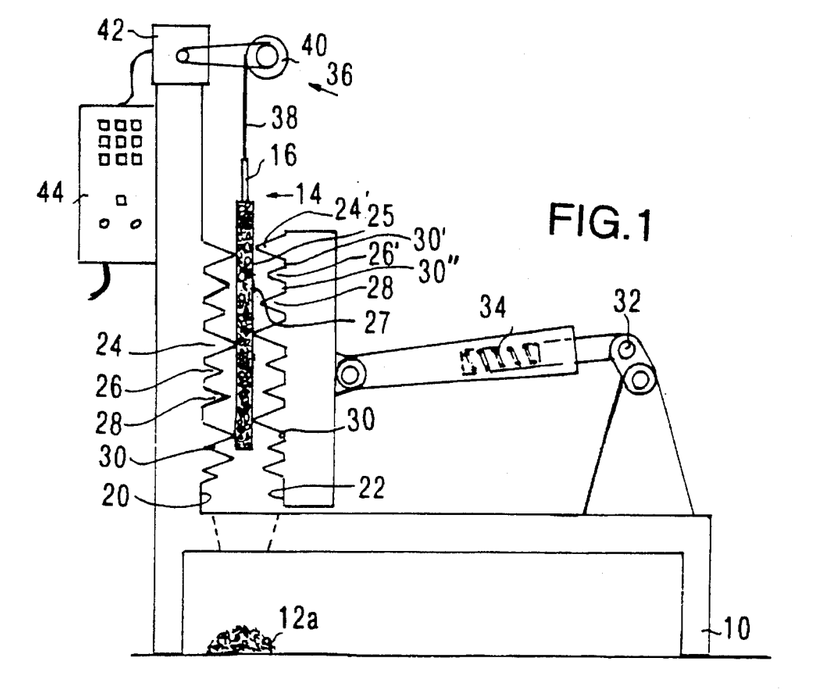
FIG. 1 is a front elevational view of a preferred embodiment of the apparatus according to the invention.

There is seen in FIG. 1 an apparatus 10 for removing discharged zinc-containing material 12a from a mechanically rechargeable zinc battery anode 14, containing the same.

With the aim of facilitating understanding of the apparatus 10, some further details are now given concerning the structure of the anode 14 which is processed by the apparatus 10.

The material 12a containing zinc oxide is a relatively brittle and abrasive material, physically somewhat similar to hardened cement. The anode 14 is of the type comprising a skeletal frame 16, including conductive metal, for example plated copper. The frame 16 has a portion of its surface area formed as open spaces (not shown). The frame 16 is undamaged and re-used after removal of the material 12a therefrom by the apparatus 10.

Figures 5, 5A:
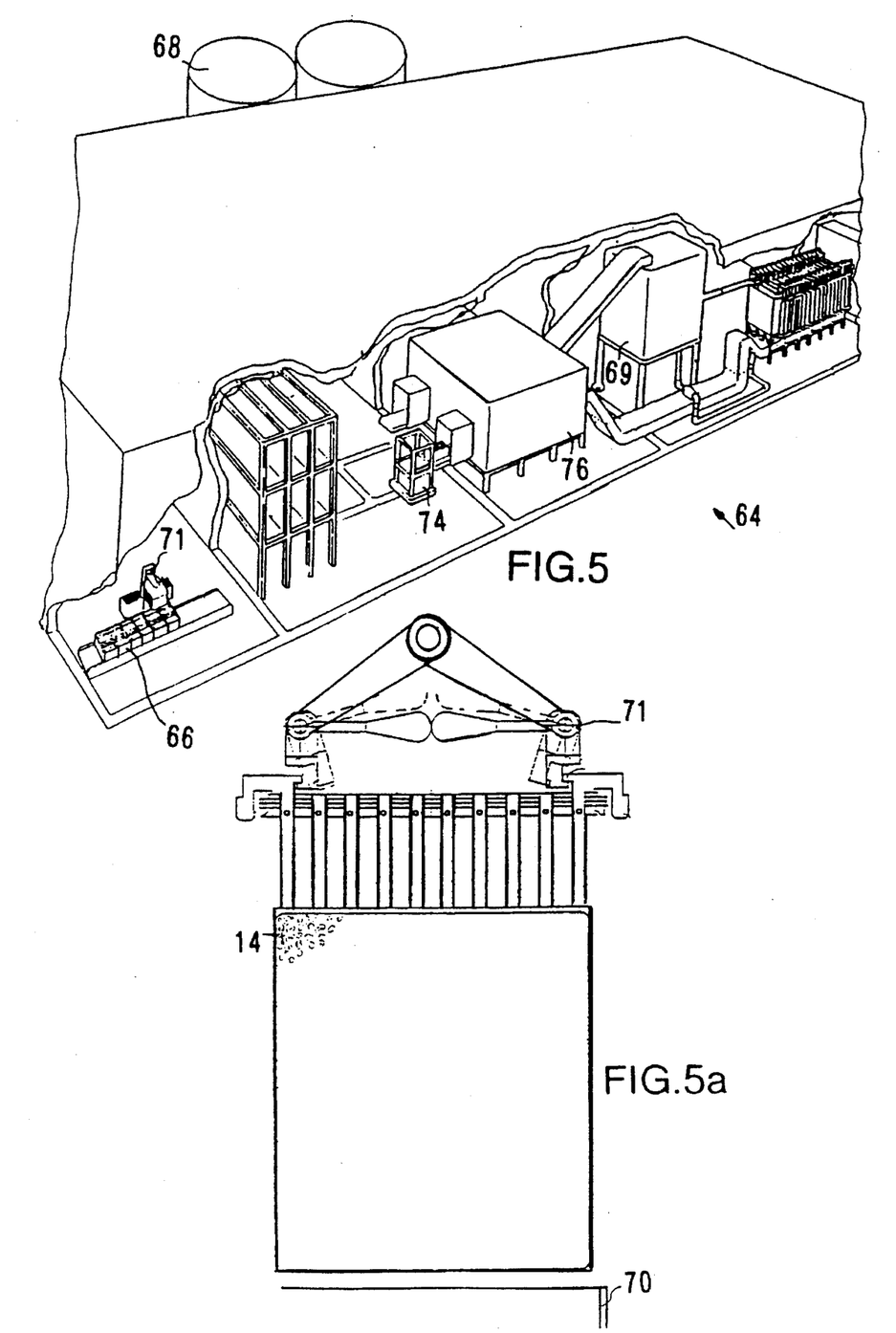
FIG. 5 is a pictorial view of a refueling system for automated recharging of zinc-air batteries.
FIG. 5a is an elevational view of automated means for simultaneously separating a plurality of spent anodes from a battery casing.
Figure 5B:
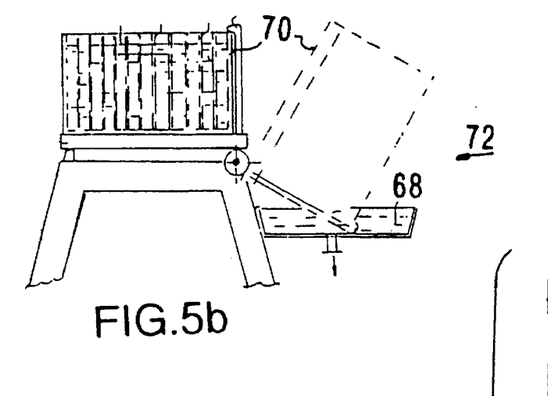
FIG. 5b is an elevational view of means for removing used electrolyte from the battery casing.
Figure 5C:
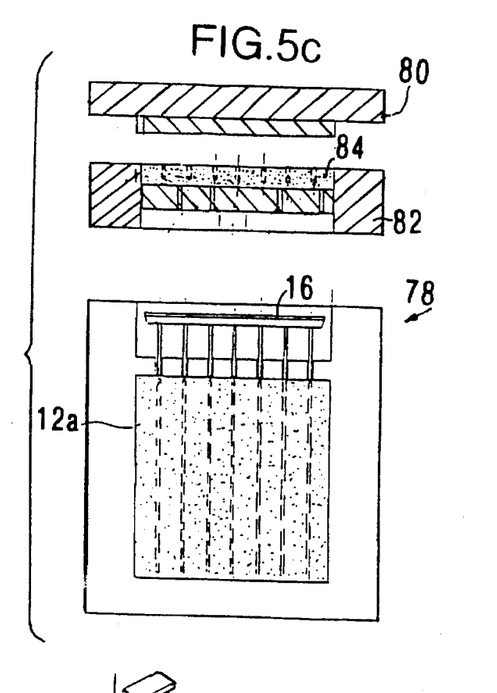
FIG. 5c includes side views and a plan view of means which are part of a press for attaching reconstituted active zinc material to a cleaned support frame.

To form a new anode 14, an active zinc anode component 12b is compacted into a rigid static bed of active anode material of tight interparticulate structure encompassing the skeletal frame 16, seen in FIG. 5c.

Referring again to the apparatus 10, this comprises a pair of spaced-apart first and second crusher plates 20, 22. Each crusher plate 20, 22 is provided with a plurality of pointed projections 24, 26, 28 of varying heights, which projections are preferably of conical or pyramidal configuration. A plurality of recesses 30 of varying depths are substantially complementary to the projections 24, 26, 28.

The crusher plates 20, 22 are aligned with each other to the effect that tips of projections 24, 26, 28 of the first crusher plate 20 substantially mutually occlude with recesses 30 provided on the second crusher plate 22. Similarly, tips of projections 24, 26, 28 of the second crusher plate 22 substantially mutually occlude with recesses 30 provided on the first surface 20.

The crusher plates 20, 22 can suitably be made from a KOH-resistant metal such as nickel, nickel-plated stainless steel, and hard-chrome plated alloy steel. Such materials will operate over an extended period without replacement.

It is also feasible to use plastic materials. These provide insurance against contamination by metal particles, and have more moderate replacement costs. Suitable plastics include polyvinylchloride, polysulfone and polyphenylene oxide.

Means are provided to cause the crusher plates 20, 22 to be periodically abruptly urged toward each other and then re-separated. In this embodiment a driven crank device 32 is provided with spring means 34, which may be adjusted to exert sufficient impact force for breaking up the material 12a, yet not damaging the skeletal frame 16 in its operation.

Advantageously, the apparatus 10 is also provided with an anode suspension device 36, which allows changing the position after each separation of the surfaces 20, 22, of the anode 14 relative to the projections 24, 26, 28. FIG. 1 shows the anode 14 suspended by means of a pair of cables 38 which are wound on a drum 40. The drum 40 is driven by a stepper motor 42 which is controlled by a programmable indexer 44 to provide any desired motion. Advantageously, the device 36 is programmed to move the anode 14, while the crusher plates 20, 22 are moved apart from each other and are not gripping the anode 14, a distance of between 1 and 3 centimeters, as corresponding to half the distance between adjacent projections. Said displacement is preferably effected alternatively and sequentially along a horizontal axis and then along a vertical axis, e.g. the anode 14 can first be displaced in a upward vertical direction and impacted and then displaced in a sideways horizontal direction and impacted again, after which it could be displaced in a downward vertical directal and impacted and then in a reverse sideways horizontal direction and impacted once again, etc. As will be explained hereinafter, the purpose of this displacement after each impact is so that the following impact takes place between the forwardmost projections of said crusher plates and convex surfaces of said anode bed, deformed by a previous impact in the direction of the adjacent forwardmost projections, so that convex projections impact against convexly-deformed surfaces of the anode bed, thereby augmenting the effect of the repeated impacts upon the anode bed, which is thereby subjected to weakening deformation followed by fragmenting impact.

Figure 2A:
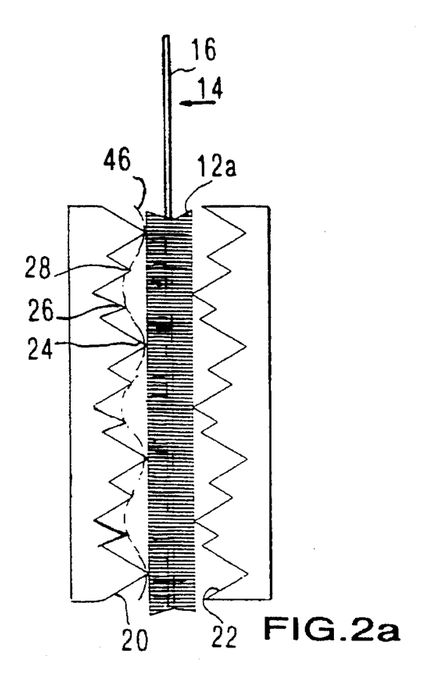
FIG. 2 is a diagrammatic view of a preferred surface, as used in the apparatus, showing three stages of progress in disintegrating an anode.
Figure 2B:
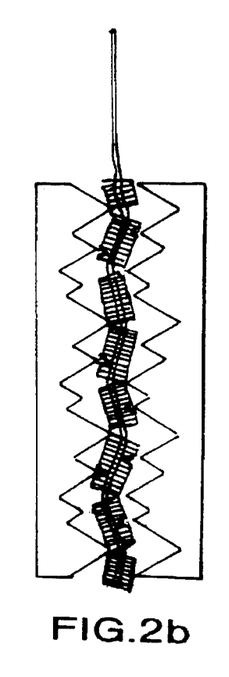
Figure 2C:
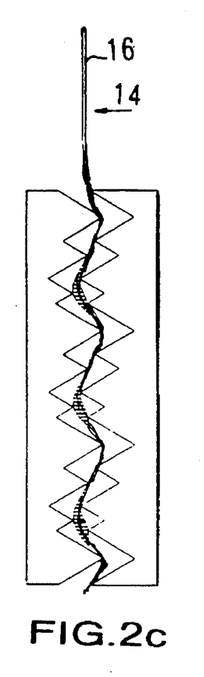

Referring now to FIG. 2, there is seen a detail of a preferred crusher plate 20 as used in the apparatus 10, showing an anode 14 in three stages of disintegration of the material 12a.

An imaginary curve 46 connecting projection tips 24, 26, 28 lying in a common plane on the crusher plate 20 is a substantially sinosoidal curve, as shown. However, alternative configurations such a linear zigzag are also utilizable in the present invention. When the apparatus 10 is in use, the anode 14 is first impacted by projections 24 of crusher plate 22, which projections are of the greatest height. Only with the follow-through of the impact do medium-height projections 28 and lower-height projections 26 also impact upon the anode bed with diminished force, the primary impact force having been delivered by forward-most projections 24. This brief and sudden impact deforms and cracks the anode 14 in a zig-zag shape, with additional indents and local cracks from the individual projections as seen in stage 2 of FIG. 2, sufficiently to break up the brittle material 12a, yet the degree of deformation is not beyond the elastic limit of the skeletal frame 16. By use of the anode suspension device 36 seen in FIG. 1, the anode is moved after one or several impacting movements of the crusher plates 20, 22, resulting in the forward-most projections 24, impacting the deformed and displaced anode at points along its major surface, which were previously not impacted by said forward-most projections and which surfaces were in fact deformed to present a convex surface, as seen in the second stage of FIG. 2 for further impactation and fragmentation, resulting in the dislodgement of the zinc material 12a from the frame 16, leaving only the almost-bare, skeletal frame, which is preferably in the form of maleable rods 16, one of which is seen in stage 3 of FIG. 2.

As stated, said displacement is preferably by at least half the distance between adjacent projection tips of at least one of said crusher plates, and e.g., referring to FIG. 1, said displacement can serve to align the point 25 on a major surface of anode 14, previously positioned opposite 30' on crusher plate 22, opposite projection 24' on crusher plate 22 for the next impact (said displaced positioning not being shown.)

Said displacement can also be by at least half the distance between adjacent projection tips, plus the distance between adjacent recesses of at least one of said crusher plates and e.g., referring to FIG. 1, said displacement can serve to align the point 27 on said major surface of anode 14, previously positioned opposite recess 30" on crusher plate 22, opposite projection 24, on crusher plate 22 for the next impact.

As can also be seen in FIG. 1, anode bed 14 can abut against the projections of a first crusher plate 20, while being impacted by a second crusher plate 22 to achieve the desired effect, or the arrangement can be such that the space between adjacent crusher plates can be abruptly reduced by simultaneously moving and impacting both crusher plates against the two opposite major surfaces of said anode bed (not shown).

Figure 3:
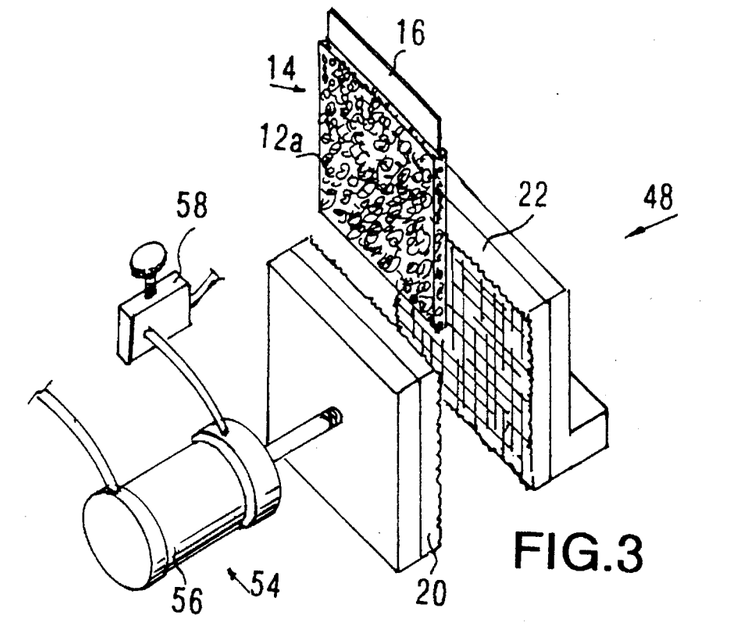
FIG. 3 is a perspective view of a further apparatus for removing discharged zinc-containing material from a battery anode.

FIG. 3 shows a further apparatus 48, similar to the apparatus 10, for removing discharged zinc-containing material 12a from a mechanically rechargeable zinc battery anode 14.

The crusher plate 20 is operationally-linked to piston means 54 for affecting the abrupt reduction of space between the plates 20, 22.

In this embodiment, piston means comprise a fluid power cylinder 56, either pneumatic or hydraulic, for effecting the desired abrupt and brief impact between the crusher plates and the anode bed. A pressure-limiting valve 58 connected to the cylinder 56 is useful for adjusting the force applied by the crusher plate 20 to be sufficient for breaking up the material 12a while preventing damage to the skeletal frame 16 and also preventing unnecessary wear of the surfaces of said crusher plates.

Figure 4:
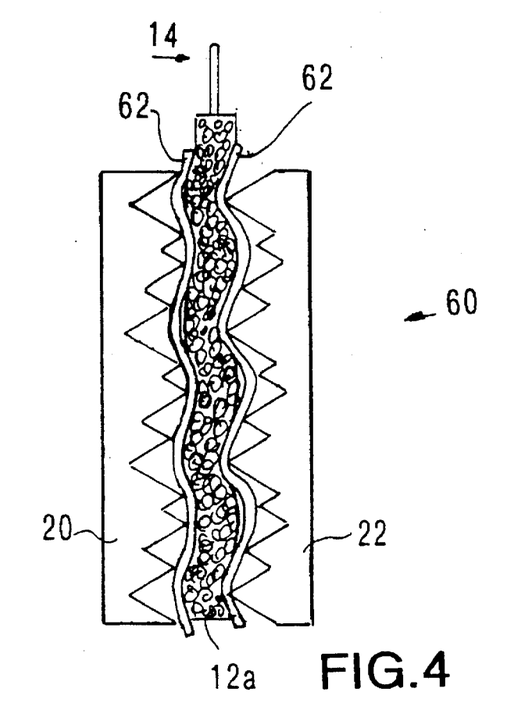
FIG. 4 is a diagrammatic view of a detail of an apparatus additionally comprising a pair of spaced-apart elastomeric sheets.

Seen in FIG. 4 is a detail of an apparatus 60, similar to the apparatus 10 but additionally comprising a pair of spaced-apart elastomeric sheets 62. Each sheet 62 is positioned adjacent to one of the crusher plates 20, 22 thus defining between themselves a cavity configured to accommodate the anode 14.

The elastomeric sheets 62 are advantageously made of a KOH-resistant material. Suitable materials include ethylene-propylene polymers, neoprene and nitriles.

The sheets 62 serve to preserve and protect from abrasion the surfaces 20, 22. The sheets 62 are far cheaper to replace than are the crusher plates 20, 22. Furthermore, use of the sheets 62 greatly widens the choice of suitable materials for construction of the crusher plates 20, 22 as these plates are then not in direct contact with the abrasive and corrosive material 12a.

Referring now to FIG. 5, there is seen a refueling system 64 for automated recharging of zinc-air batteries 66 of the type having a plurality of active zinc anode elements 14 formed of active zinc material 12b compactly pressed to a support frame 16 immersed in an aqueous alkaline electrolyte 68 in a battery casing 70, seen in FIG. 5b. The system 64 includes a station for converting zinc oxide to active zinc.

The refueling system 64 comprises the following main components, which have been described in detail in U.S. patent application Ser. No. 08/122,788, filed 15.09.93, and the teachings of which are incorporated herein by reference.

FIG. 5a shows automated means 71 for simultaneously separating a plurality of spent anodes 14 from the battery casing 70.

FIG. 5b shows means 72 for removing used electrolyte 68 from the casing 70.

Item 74 in FIG. 5 depicts transport means for conveying spent anodes to an anode processing station 76.

At the station 76, zinc 12a, which has been at least partly oxidized, is removed from the support frame 16. This operation is executed by use of the apparatus 48, previously described with reference to FIG. 3.

FIG. 5c shows means 78, which is part of a press 80, for attaching reconstituted active zinc material 12a to a cleaned support frame 16.

The press 80 is provided with a container 82 configured to hold the frame 16 immersed in a pre-weighted zinc slurry 84. The press 80 is provided with means for applying a pressure of at least 20 kg/cm$^2$ over the surface of the slurry 84, to form an active zinc anode 14, having active zinc material 12b compactly pressed to the frame 16.

Figure 5D:
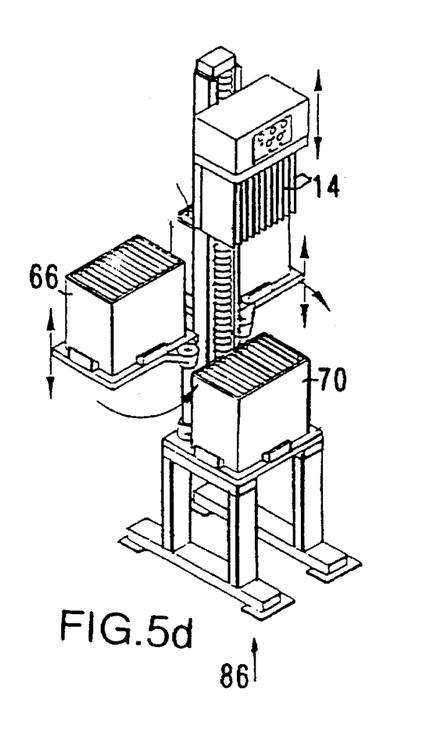
FIG. 5d is a perspective view of means for simultaneously introducing a plurality of active zinc anodes into a battery casing.

In FIG. 5d there is seen automated means 86 for simultaneously introducing a plurality of active zinc anodes 14 into a battery casing 70.

Figure 5E:
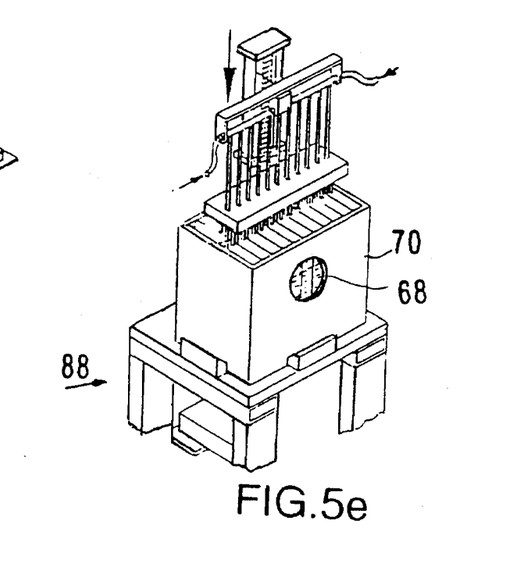
FIG. 5e is a perspective view of means for introducing fresh electrolyte into the battery casing.

To complete the refueling system, FIG. 5e shows means 88 for introducing fresh electrolyte 68 into the battery casing 70.

There is now described the process of the present invention. This process is for removing discharged zinc-containing material 12a from the mechanically rechargeable zinc battery anode 14 previously described.

The process includes the following five steps:
STEP A

Introducing the anode 14 in which said active zinc has been at least partly oxidized, between a pair of spaced-apart first and second crusher plates 20, 22, each of these crusher plates being provided with a plurality of projections 24, 26, 28, of varying heights and a plurality of recesses 30 of varying depths, substantially complementary to these projections.

The crusher plates 20, 22 are aligned with each other to the effect that tips of projections 24, 26, 28 of the first crusher plate 20 substantially mutually occlude with recesses 30 provided on the second crusher plate 22. Similarly, the tips of projections 24, 26, 28 of the second crusher plate 22 substantially mutually occlude with recesses 30 provided on the first crusher plate 20.

At least one of the plates 20, 22 is operationally-linked to piston means 54 for affecting the relative movement between said plates.

STEP B

Causing the crusher plates 20, 22 to abruptly approach each other while briefly impacting at least indirectly on the anode 14 bed, to deform and crack the same.

STEP C

Causing the crusher plates 20, 22 to move away from each other and then displacing the deformed anode 14 bed, along at least a first axis, by at least half the distance between adjacent projection tips of at least one of the crusher plates. Typically, such a displacement will be in the range of 1 to 3 centimeters, although greater displacement could also be effected.

Advantageously, such displacement is effected sequentially and alternately along two axes.

STEP D

Causing the crusher plates 20, 22 to once again approach each other while impacting on and fragmenting the deformed anode bed.

STEP E

Repeating steps C and D until the fragmentation of said bed and the dislodgement of the resulting fragmented particles 12a from the skeletal frame 16 are achieved.

It will be evident to those skilled in the art that the invention is not limited to the details of the foregoing illustrative embodiments, and that the present invention may be embodied in other specific forms without departing from the essential attributes thereof, and it is therefore desired that the present embodiments be considered in all respects as illustrative and not restrictive, reference being made to the appended claims, rather than to the foregoing description, and all changes which come within the meaning and range of equivalency of the claims are therefore intended to be embraced therein.

What is claimed is:

1. A process for removing discharged active zinc-containing material from a mechanically rechargeable zinc battery anode, containing the same, said anode being of the type comprising a skeletal frame, including conductive metal and having a portion of a surface area thereof formed as open spaces, and an active zinc anode component compacted into a rigid static bed of active anode material encompassing the skeletal frame, and having two opposite major surfaces, said process comprising:

a) introducing said anode in which said active zinc has been at least partly oxidized, between a pair of spaced-apart first and second crusher plates, each of said crusher plates being provided with a plurality of pointed projections of varying heights and a plurality of recesses of varying depths substantially complementary to said projections, said crusher plates being aligned with each other to the effect that tips of projections of said first crusher plate substantially mutually occlude with recesses provided on said second crusher plate and tips of projections of said second crusher plate substantially mutually occlude with recesses provided on said first surface;

b) abruptly reducing the space between adjacent crusher plates while impacting at least indirectly on said anode bed positioned there-between to deform and crack said anode bed;

c) moving said crusher plates away from each other and from said deformed anode bed and then displacing said deformed bed, along at least a first axis, by at least half the distance between adjacent projection tips of at least one of said crusher plates;

d) once again abruptly reducing the space between adjacent crusher plates while impacting on and fragmenting said displaced anode bed; and e) repeating steps c and d until the fragmentation of said bed and the dislodgement of the resulting fragmented particles from said skeletal frame are achieved.

2. A process according to claim 1, wherein said displacement of said impacted bed is affected alternatively and sequentially along a horizontal axis and a vertical axis.

3. A process according to claim 1, wherein an imaginary curve connecting projection tips lying in a common plane on one of said crusher plates is a substantially sinosoidal curve.

4. A process according to claim 1, wherein at least one of said plates is operationally-linked to piston means for affecting the relative movement between said plates.

5. Apparatus for removing discharged active zinc-containing material from a mechanically rechargeable zinc battery anode, containing the same, said anode being of the type comprising a skeletal frame, including conductive metal and having a portion of a surface area thereof formed as open spaces, and an active zinc anode component compacted into a rigid static bed of active anode material encompassing the skeletal frame, said apparatus comprising a pair of spaced-apart first and second crusher plates, each of said crusher plates being provided with a plurality of pointed projections of varying heights and a plurality of recesses of varying depths substantially complementary to said projections, said crusher plates being aligned with each other to the effect that tips-of projections of said first crusher plate substantially mutually occlude with recesses provided on said second crusher plate and tips of projections of said second crusher plate substantially mutually occlude with recesses provided on said first crusher plate.

6. Apparatus, according to claim 5, for removing discharged active zinc-containing material from a mechanically rechargeable zinc battery anode containing the same, wherein an imaginary curve connecting projection tips lying in a common plane on one of said crusher plates is a substantially sinosoidal curve.

7. Apparatus, according to claim 5, for removing discharged active zinc-containing material from a mechanically rechargeable zinc battery anode containing the same, wherein at least one of said plates is operationally-linked to piston means for affecting abrupt relative movement between said plates.

8. Apparatus, according to claim 7, wherein said piston means are pneumatically actuated.

9. Apparatus, according to claim 5, for removing discharged active zinc-containing material from a mechanically rechargeable zinc battery anode containing the same, further comprising a pair of spaced-apart elastomeric sheets, each sheet being positioned adjacent one of said crusher plates and defining between themselves a cavity configured to accommodate said anode.

10. Apparatus, according to claim 9, wherein said elastomeric sheets are made of KOH-resistant material.

11. Apparatus, according to claim 10, wherein said material is selected from the group consisting of ethylene-propylene polymers, neoprene and nitriles.

12. Apparatus, according to claim 5, wherein said crusher plates are made of a material selected from the group consisting of KOH-resistant metal and plastic.

13. Apparatus, according to claim 12, wherein said crusher plates are made of a plastic selected from the group consisting of polyvinylchloride, polysulfone and polyphenylene oxide.

14. Apparatus, according to claim 12, wherein said surfaces are made of metal selected from the group consisting of nickel and nickel-plated stainless steel.

15. A refueling system for automated recharging of zinc-air batteries of the type having a plurality of active zinc anode elements formed of active zinc material compactly pressed to a support frame immersed in an aqueous alkaline electrolyte in a battery casing, said system comprising:

a) automated means for simultaneously separating a plurality of spent anodes from said casing; said spent anodes comprising support frames to which are attached zinc which has been at least partially oxidized;

b) means for removing used electrolyte from said casing;

c) transport means for conveying spent anodes to an anode processing station;

d) said anode processing station, at which said zinc, which has been at least partly oxidized, is removed from said support frame, said station comprising apparatus for removing discharged active zinc-containing material from said spent anodes, said apparatus comprising a pair of spaced-apart first and second crusher plates, each of said crusher plates being provided with a plurality of pointed projections of varying heights and a plurality of recesses of varying depths substantially complementary to said projections, said crusher plates being aligned with each other to the effect that tips of projections of said first crusher plate substantially mutually occlude with recesses provided on said second crusher plate and tips of projections of said second crusher plate substantially mutually occlude with recesses provided on said first crusher plate, and at least one of said plates is operationally-linked to piston means for affecting abrupt movement between said plates.

e) means for attaching reconstituted active zinc material to a cleaned support frame, comprising a press provided with a container configured to hold said frame immersed in a pre-weighed zinc slurry, said press being provided with means for applying a pressure of at least 20 kg/cm$^2$ over the surface of said slurry, to form an active zinc anode, having active zinc material compactly pressed to support frame;

f) automated means for simultaneously introducing a plurality of active zinc anodes into said casing; and g) means for introducing fresh electrolyte into said casing.

\* \* \* \* \*